United States Patent
Ozawa

(10) Patent No.: US 7,257,831 B1
(45) Date of Patent: Aug. 14, 2007

(54) PROGRAM DISTRIBUTION SYSTEM, METHOD OF PROGRAM DISTRIBUTION, TRANSMITTER AND RECEIVER

(75) Inventor: Toshiro Ozawa, Kanagawa (JP)

(73) Assignee: Sony Corportion (JP)

( * ) Notice: Subject to any disclaimer, the term of this patent is extended or adjusted under 35 U.S.C. 154(b) by 389 days.

(21) Appl. No.: 09/521,176

(22) Filed: Mar. 8, 2000

(30) Foreign Application Priority Data

Mar. 10, 1999 (JP) ................ P11-063491

(51) Int. Cl.
  *H04N 7/173* (2006.01)
  *G06F 7/00* (2006.01)
  *G06F 17/30* (2006.01)
(52) U.S. Cl. ........................ 725/86; 725/110
(58) Field of Classification Search ................ 725/87, 725/86, 91, 92, 93, 100, 89, 131, 105, 109, 725/110, 122, 37, 38, 33, 136
See application file for complete search history.

(56) References Cited

U.S. PATENT DOCUMENTS

| | | | | |
|---|---|---|---|---|
| 5,276,866 A | * | 1/1994 | Paolini | 725/114 |
| 5,550,863 A | * | 8/1996 | Yurt et al. | 375/240 |
| 5,613,190 A | * | 3/1997 | Hylton | 725/81 |
| 5,721,829 A | * | 2/1998 | Dunn et al. | 725/87 |
| 5,805,763 A | * | 9/1998 | Lawler et al. | 386/83 |
| 5,838,314 A | | 11/1998 | Neel et al. | |
| 5,914,712 A | * | 6/1999 | Sartain et al. | 725/9 |
| 6,477,647 B1 | * | 11/2002 | Venkatraman et al. | 713/193 |
| 2001/0041053 A1 | * | 11/2001 | Abecassis | 386/83 |

FOREIGN PATENT DOCUMENTS

| | | |
|---|---|---|
| EP | 0 872 987 A2 | 10/1998 |
| WO | WO-97/46230 A1 | 12/1997 |

* cited by examiner

*Primary Examiner*—John Miller
*Assistant Examiner*—Dominic Saltarelli
(74) *Attorney, Agent, or Firm*—Lerner, David, Littenberg, Krumholz & Mentlik, LLP

(57) ABSTRACT

A program distribution system enabling a user to easily buy a program includes a video server for storing a plurality of distributable programs, and a video on demand controller which receives a request for the distribution of a distributable program from an integrated receiver decoder. The distribution request is formed in a free-style text format described in the arbitrary style of the user of the receiver decoder. The controller compares a word described in the distribution request with each title of the distributable programs stored in the video server, and if a title that corresponds to the word described in the distribution request is found, the controller reads out the corresponding distributing program from the video server and distributes it to the receiver decoder.

40 Claims, 4 Drawing Sheets

```
To   :vodrequest@operator.co.jp
From :user1@operator.co.jp
Subj :VODreq
```
Text
```
I WANT TO VIEW "THE TITANIX"
```
Ereq

FIG. 4

```
To   :user1@operator.co.jp
From :VODrequest@operator.co.jp
Subj :VODans
```
Text
```
PROGRAM FOUND.
TITLE: THE TITANIX
TIME: 3 HR. 15 MIN.
FEE: 900 YEN DO YOU BUY THIS PROGRAM?
         [ OK ] B1   [ CANCEL ] B2
```
Eans

FIG. 5

PROGRAM DISTRIBUTION SYSTEM, METHOD OF PROGRAM DISTRIBUTION, TRANSMITTER AND RECEIVER

FIELD OF THE INVENTION

The present invention relates to a program distribution system, a method of program distribution, a transmitter and a receiver, and is applicable to a video on demand (VOD) service in satellite broadcasting for example.

DESCRIPTION OF THE RELATED ART

In satellite broadcasting or cable television, a service called pay per view (hereinafter, this is referred to as PPV) has been provided in which a user pays a viewing fee for viewing each of his desired pay programs (this is referred to as "buy a program").

When executing the above PPV service, the user first operates a receiver called an integrated receiver decoder (IRD) so that an electronic program guide (EPG) is displayed on a monitor screen that is connected to the IRD. The user then specifies on the EPG the desired program that he wants to buy and view. The IRD transmits the program ID of the program that was specified by the user to a distributor via a public telephone circuit or a cable television circuit as purchase information. Each program to be provided by the PPV service has been enciphered respectively, and the distributor transmits cryptanalytic information, called a "key", that deciphers the program bought by the user according to the purchase information to the IRD of the user. Then, the IRD deciphers the program bought by the user with the above cryptanalytic information and displays the deciphered program.

Furthermore, in satellite broadcasting or cable television, there is a service called video on demand (hereinafter, this is referred to as VOD) in which a user transmits the distribution request (request) of a desired program to the distributor when he wants, and the distributor responds to the request by distributing the program to the user. By using the VOD service, the user can view his desired program when he wants similar to operating a video tape recorder (VTR).

In the above PPV service, it is necessary that the user previously buy the program before the program is broadcast. Therefore, there is a problem that the user must remember the channel number of the bought program and its air time, and if the user forgets the channel number and the air time, the user is unable to view or record the program.

Moreover, in the VOD service, there is a problem that when the user records his bought program with a VTR, he must operate the VTR in synchronization with the start of the distribution of the bought program, making the recording operation troublesome.

SUMMARY OF THE INVENTION

In view of the foregoing, an object of this invention is to provide a program distribution system, a method of program distribution, a transmitter and a receiver that enable the user to easily buy a program, and that have improved operability.

The foregoing objects and other objects of the invention have been achieved by the provision of a distributable program storing unit for storing plural distributable programs, and a distribution controller for receiving from a specified receiver a distribution request to distribute a distributable program. The distribution request is formed in a free-style format text described in the arbitrary style of the user of the specified receiver. The controller compares a word described in the distribution request with each title of the distributable programs stored in the storing unit, and if the title corresponding to the word described in the distribution request is found, the controller reads out the distributable program having the specified title from the storing unit. The invention further provides a distributor for distributing the read-out distributable program to the receiver, and the receiver for receiving the distributed program. Thus, a program distribution system by which a user can easily buy a program can be obtained.

Moreover, if the title corresponding to the word described in the distribution request is found, the distribution controller transmits a notice of correspondence to the receiver showing that the corresponding title was found, and at the same time, it transmits a control command attached to the notice of correspondence to record the distributed program by controlling a video tape recorder that is connected to the receiver.

The distribution request is compared with each title of the distributable programs, and if a title corresponding to the word described in the distribution request is found, the distributable program having that title is distributed. Therefore, the user can enter the distribution request in his arbitrary style; he can easily perform a distribution request.

Furthermore, since the video tape recorder control command will be transmitted by being attached to the notice of correspondence, it is not necessary for the user to separately operate the video tape recorder; therefore, operability in program recording is improved.

The nature, principle and utility of the invention will become more apparent from the following detailed description when read in conjunction with the accompanying drawings in which like parts are designated by like reference numerals or characters.

BRIEF DESCRIPTION OF THE DRAWINGS

In the accompanying drawings:

FIG. 4 is a diagram showing an example of an entry in a request mail; and

FIG. 5 is a diagram illustrating an example of an entry in an answer mail.

DETAILED DESCRIPTION OF THE PREFERRED EMBODIMENT

Preferred embodiments of the present invention will be described with reference to the accompanying drawings.

Figure 1:
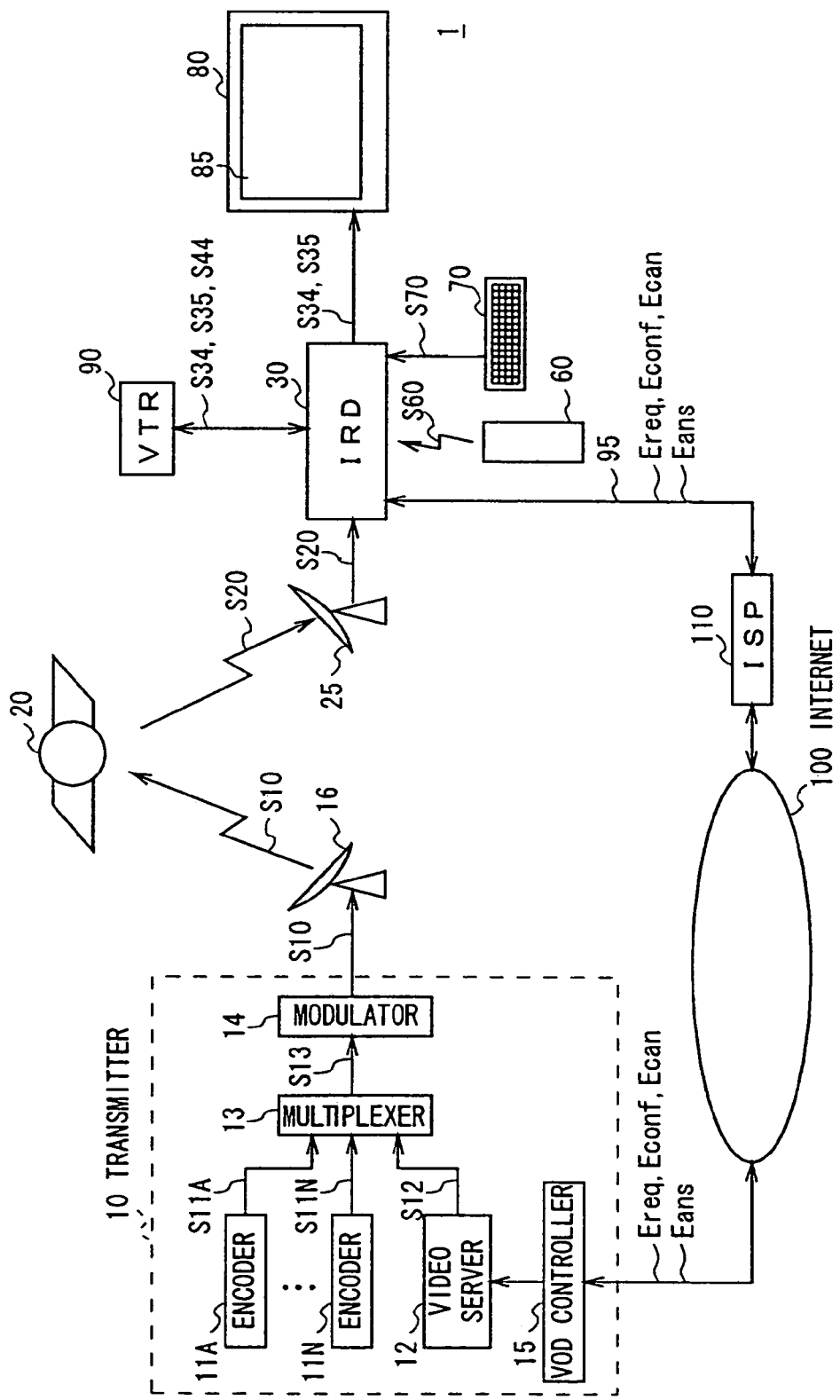
FIG. 1 is a block diagram showing the configuration of a digital broadcasting system of an embodiment of the present invention.

Referring to FIG. 1, 1 generally shows a digital satellite broadcasting system. On a sending end, a transmitter 10 compressively codes video and audio signals on plural channels supplied from external equipment by each corresponding encoder 11A to 11N according to a moving picture experts group (MPEG)-2 system, and transmits the coded signals to a multiplexer 13 as bit streams S11A to S11N.

On the other hand, a VOD controller 15 acting as a distribution controller controls a video server 12 acting as a distributable program storing unit according to a distribution request in a video on demand (hereinafter, it is referred to as VOD) service, transmitted from an IRD 30, to encipher a program described in the distribution request, and to transmit the enciphered program to the multiplexer 13 as a VOD bit stream S12.

The multiplexer 13 acting as a distributor divides the bit streams S11A to S11N and the VOD bit stream S12 into packets of 188 byte length called transport stream (TS) packets, and then performs time division multiplexing on the bit streams S11A to S11N and VOD bit stream S12 for each packet to generate a transport stream S13. The transport stream S13 is supplied to a modulator 14 acting as a distributor. The modulator 14 modulates the transport stream S13 and transmits the modulated data to a broadcast satellite 20 as a broadcast wave S10 via a transmitting antenna 16. The broadcast satellite 20 receives the broadcast wave S10 with a transponder (not shown), amplifies it, and transmits the amplified wave to the earth as a broadcast wave S20.

On a receiving end, an integrated receiver decoder (IRD) 30 acting as a receiver receives the broadcast wave S20 via a receiving antenna 25. The IRD decodes video and sound on a channel that is selected by a user's operation of a remote commander 60 from among the video and audio signals on a plurality of channels multiplexed on the broadcast wave S20. The IRD 30 transmits the generated video signal S34 and audio signal S35 to the display 85 and the speaker (not shown) of a monitor 80 for output as video and sound.

A video tape recorder (VTR) 90 is connected to the IRD 30. The IRD 30 controls the VTR 90 according to the user's operation, and outputs the video signal S34 and the audio signal S35 to the VTR 90.

Furthermore, a keyboard 70 is connected to the IRD 30; the IRD 30 can transmit text entered on the keyboard 70 by the user to an internet 100 as an e-mail via a telephone line 95 and an internet service provider (ISP) 110, and can transmit a distribution request in the VOD service to the transmitter 10 using the above e-mail.

Figure 2:
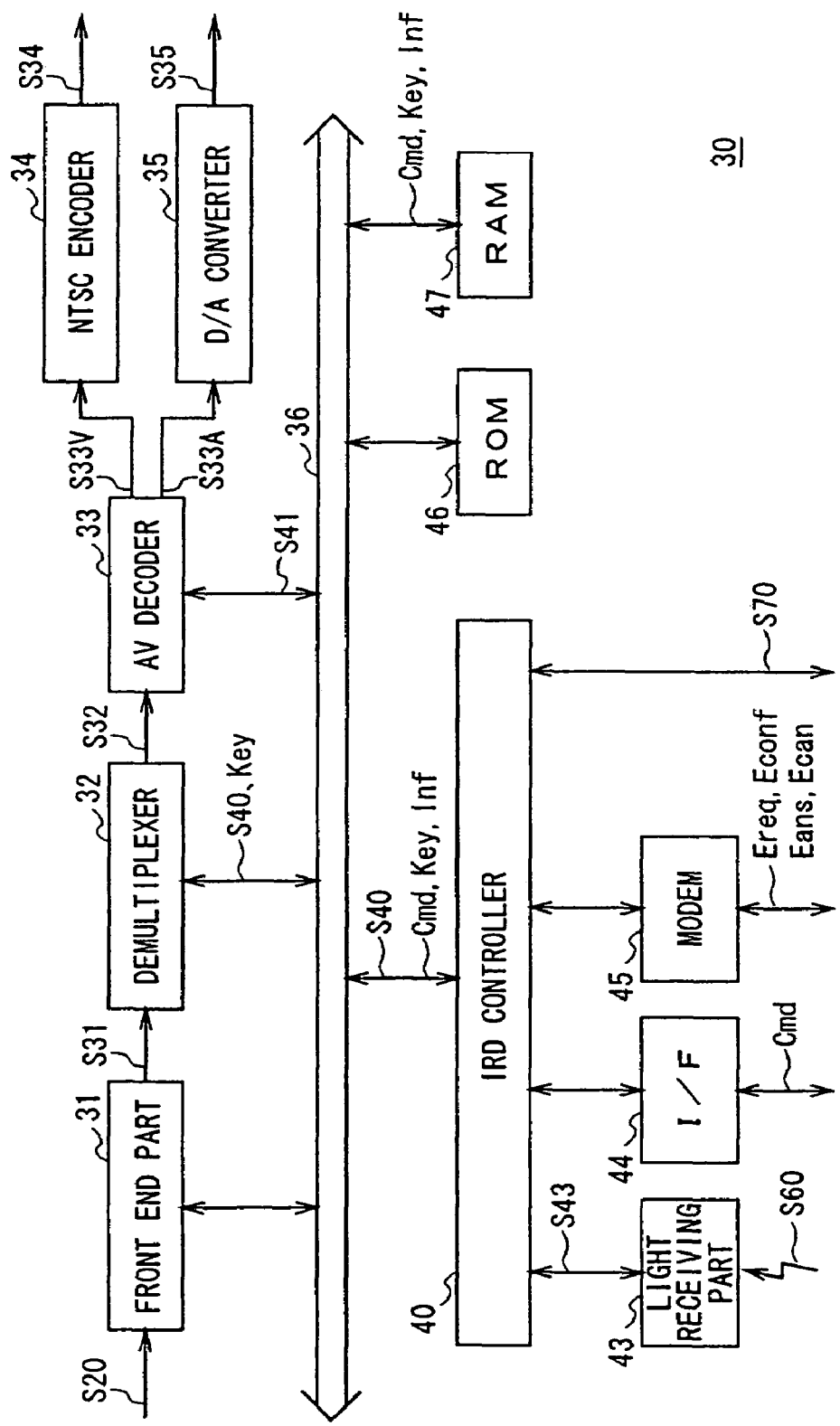
FIG. 2 is a block diagram showing the configuration of an IRD.

FIG. 2 generally shows the IRD 30. The broadcast wave S20 received via the receiving antenna 25 is demodulated in a front end part 31, and a bit stream S31 is generated. This bit stream S31 is transmitted to a demultiplexer 32.

The demultiplexer 32 separates the packets on the channel selected by the user from the bit stream S31. That is, if the user selects his desired channel by operating the remote commander 60 (FIG. 1), the remote commander 60 superimposes a channel select command entered by the user's operation on an infrared light S60, and transmits this to the IRD 30.

A light receiving part 43 provided in the IRD 30 receives and demodulates the infrared light S60, obtains the channel select command as an operational signal S43, and transmits this signal S43 to an IRD controller 40. The IRD controller 40 supplies a control signal S40 that is a command to select the channel selected by the user to the demultiplexer 32 via a bus 36, based on the operational signal S43. The demultiplexer 32 operates in response to the control signal S40 to separate the TS packets on the channel selected by the user from the transport stream S31, and supplies the separated products to an audio visual (AV) decoder 33 as a bit stream S32.

The AV decoder 33 decodes the bit stream S32 by the MPEG-2 system, generating video data S33V and audio data S33A, and outputs the video data S33V to a National Television System Committee (NTSC) encoder 34 and the audio data S33A to a digital/analog (D/A) converter 35. The NTSC encoder 34 converts the video data S33V into an analog video signal in the NTSC system and outputs it as a video signal S34 to be displayed on the monitor (FIG. 1). The D/A converter 35 performs analog conversion on the audio data S33A, and outputs it to the monitor 80 as an audio signal S35.

Also the keyboard 70 (FIG. 1) is connected to the IRD controller 40. The above keyboard 70 supplies its output to the IRD controller 40 as a keyboard input signal S70.

Figure 3:
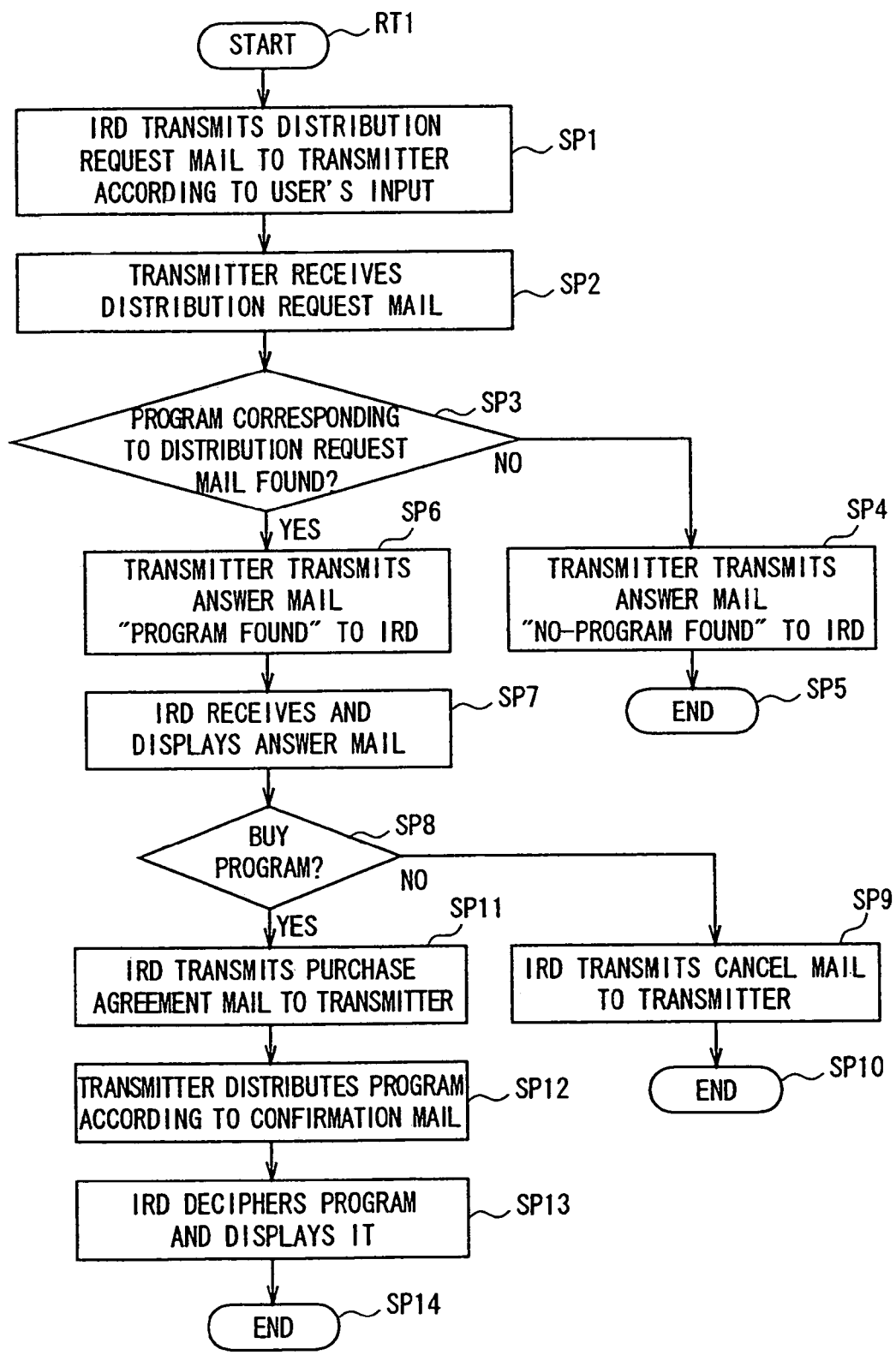
FIG. 3 is a flowchart showing program distribution processing.

The digital satellite broadcasting system 1 executes program distribution processing to perform the VOD service, as shown in FIG. 3.

Specifically, the digital satellite broadcasting system 1 (FIG. 1) starts the processing at RT1. In step SP1, the IRD controller 40 of the IRD 30 (FIG. 2) converts a request for distribution on the VOD into an e-mail or "Ereq" according to the entry of the distribution request by the user's keyboard operation. The IRD transmits the Ereq to the transmitter 10 as a distribution request via a modem 45, the telephone line 95 (FIG. 1), the ISP 110 and the internet 100.

FIG. 4 shows an example of an entry in an Ereq. In the field of sending e-mail address "To", the e-mail address of the VOD controller 15 of the transmitter 10 "vodrequest@operator.co.jp" is entered by the IRD controller 40. In the field of sender's e-mail "From", the e-mail address of the IRD 30 (FIG. 1) "user1@operator.co.jp" is entered. A predetermined subject "VODreq" showing that the e-mail is a VOD distribution request mail is entered in the field of e-mail subject "Subj".

The user enters the distribution request showing the title of a program that he wants in the text field of the e-mail (labeled "Text") using keyboard 70 (FIG. 1). The entry in the above distribution request is similar in operation to the entry in a normal e-mail. Besides, a distribution request has no specific rule of entry, and the user may enter the title of the program in a free style format (free text). Therefore, the user can easily fill up the distribution request. Moreover, it is unnecessary that when the user enters the distribution request statement, the user previously confirms whether or not the requested program has been provided in the VOD service. The user can easily fill in the distribution request.

In step SP2, the VOD controller 15 provided in the transmitter 10 receives the distribution request mail Ereq via the internet 100. In the following step SP3, the VOD controller 15 compares each word in the text field of the distribution request mail Ereq with each title of the plurality of VOD programs stored in the video server 12 provided in the transmitter 10, and determines whether or not a program corresponding to the distribution request can be found.

If a negative result is obtained in step SP3, no program corresponding to the distribution request statement exists. The VOD controller 15 proceeds to step SP4. Then, in step SP4, the VOD controller 15 transmits to the IRD 30 an answer mail or Eans of "no-program found" showing that no program corresponding to the distribution request has been provided in the VOD service. The processing is finished in step SP5.

On the other hand, if an affirmative result is obtained in step SP3, a program corresponding to the distribution request exists. The VOD controller 15 proceeds to step SP6. Then, in step SP6, the VOD controller 15 transmits to the IRD 30 the answer mail Eans of "program found" showing that there is a program corresponding to the distribution request.

FIG. 5 shows an example of a description on the answer mail Eans in the case of "program found". In the field of sending e-mail address "To", "user1@operator.co.jp" showing the e-mail address of the IRD 30 (FIG. 1) is entered by the VOD controller 15. In the field of sender's e-mail "From", "vodrequest@operator.co.jp" showing the e-mail address of the VOD controller 15 (FIG. 1) is entered. A predetermined subject "VODans" showing that the mail is an answer mail is entered in the field of e-mail subject "Subj". In the text field of the e-mail (labeled "Text"), the VOD controller 15 enters the composition "program found" showing that the program corresponding to the distribution request has been found, the title of the program, its time, its price, the composition "Do you buy this program?", and an OK button B1 and a cancel button B2 programmed by the hypertext markup language (HTML). Moreover, accounting information on the program "Inf", cryptanalytic information "Key" and a control command "Cmd" to make the VTR 90 that is connected to the IRD 30 start recording in synchronization with the start of broadcasting the program are attached to the answer mail Eans.

In step SP7, the IRD controller 40 of the IRD 30 receives the answer mail Eans, controls the NTSC decoder 34 according to the answer mail Eans, and outputs and displays the content of the answer mail Eans on the monitor 80 (FIG. 1) as the video signal S34. At the same time, the IRD 30 stores the accounting information Inf, cryptanalytic information Key and control command Cmd attached to the answer mail Eans in a random access memory (RAM) 47.

The user reads the answer mail Eans displayed on the monitor 80 and determines whether to buy the program or not. The user specifies the OK button B1 (if he wants to buy the program) or the cancel button B2 (if he does not want to buy the program) by operating the remote commander 60 or the keyboard 70.

In step SP8, the IRD controller 40 of the IRD 30 determines whether the user wants to buy the program or not according to the specification by the user of the OK button B1 or the cancel button B2. If a negative result is obtained in step SP8, the user has specified the cancel button B2 and cancelled the purchase of the program. The IRD controller 40 proceeds to step SP9 to transmit to the transmitter 10 a cancel mail or "Ecan" showing the cancellation of the purchase of the program, and finishes the processing in step SP10.

On the other hand, if an affirmative result is obtained in step SP8, the user has specified the OK button B1 and agreed to the purchase of the program. The IRD controller 40 proceeds to step SP11 to transmit to the transmitter 10 a purchase agreement mail or "Econf" showing the agreement to the purchase of the program.

In step SP12, the VOD controller 15 of the transmitter 10 transmits the program described in the answer mail Eans to the multiplexer 13 as the bit stream S12 by controlling the video server 12 according to the purchase agreement mail Econf, multiplexes the bit stream S12 on the broadcast wave S10, and transmits it.

In step SP13, the IRD controller 40 of the IRD 30 reads out the cryptanalytic information Key from the RAM 47, and supplies the cryptanalytic information Key and the control signal S40 showing the command to select the VOD channel to the demultiplexer 32 via the bus 36. The demultiplexer 32 operates in response to the control signal S40, separates the TS packets on the VOD channel from the transport stream S31, and at the same time, deciphers the TS packets by means of the cryptanalytic information Key and displays the result on the monitor 80 (FIG. 1).

Moreover, the IRD controller 40 reads out the control command Cmd from the RAM 47, and supplies this to the VTR 90 (FIG. 1) via the interface 44 in synchronization with the start of broadcasting the program on the VOD channel.

The VTR 90 operates in response to the control command Cmd to record the video signal S34 and the audio signal S35.

The digital satellite broadcasting system 1 performs program distribution in the VOD service in this manner, and finishes the processing in step SP14.

According to the above configuration, the user enters the request for the VOD distribution of an arbitrary program in a free style format on the keyboard 70. The IRD 30 converts the distribution request into an e-mail and transmits this to the transmitter 10 as the distribution request mail Ereq.

The VOD controller 15 of the transmitter 10 compares each word in the distribution request with each title of the plurality of VOD programs stored in the video server 12 provided in the transmitter 10 to determine whether a program corresponding to the distribution request can be found or not. If the program corresponding to the distribution request can not be found, the VOD controller 15 transmits the answer mail Enas of "no-program found" to the IRD 30. On the other hand, if the program corresponding to the distribution request is found, the VOD controller 15 transmits the answer mail Eans of "program found" to the IRD 30. At this time, the VOD controller 15 attaches the cryptanalytic information Key of the program and the VTR 90 control command Cmd to the answer mail Eans.

If it receives the answer mail Eans of "program found", the IRD 30 displays this on the monitor 80. The user watches the above display and determines whether or not to buy the program, and enters his decision to the IRD 30 using the remote commander 60 or the keyboard 70. If the user agrees to buy the program, the IRD 30 transmits the purchase agreement mail Econf to the transmitter 10. The transmitter 10 multiplexes the program that the user requested on the broadcast wave S10 according to the purchase agreement mail Econf and transmits this.

The IRD 30 receives the broadcast wave S10, deciphers the program by means of the cryptanalytic information Key and displays the deciphered program on the monitor 80, and at the same time, controls the VTR 90 according to the control command Cmd to execute the recording of the VOD program.

According to the above configuration, since the VOD controller 15 compares the distribution request with each title of the VOD programs stored in the video server 12 to determine the presence of the program corresponding to the distribution request, the user can enter the distribution request in a free style format. Thus, the user can easily perform a distribution request on the VOD service.

Moreover, since the VOD controller 15 transmits the VTR 90 control command Cmd by attaching it to the answer mail Eans and the IRD 30 controls the VTR 90 according to the control command Cmd to execute the recording of the VOD program, the user can easily record the VOD program without operating the VTR 90 separately.

In the aforementioned embodiment, the present invention is applied to a digital broadcasting system using a broadcast satellite. However, the present invention is not limited to this, but may be applied to another broadcasting system, such as cable television, for example. In this case, the distribution request mail Ereq, the answer mail Eans, the purchase agreement mail Econf and the cancel mail Ecan may be transmitted/received via the cable circuit of a cable television system.

While there has been described preferred embodiments of the invention, it will be obvious to those skilled in the art that various changes and modifications to these embodiments may be made. Accordingly, the appended claims are intended to cover all such changes and modifications as fall within the true spirit and scope of the invention.

What is claimed is:

1. A program distribution system comprising:
   a receiver; and
   a transmitter including a distribution controller;
   said receiver being operable to accept a user request for a desired program, the user request being in a free style text format, to convert the user request into a distribution request e-mail message that includes the user request and that is addressed to said distribution controller of said transmitter, and to send the distribution request e-mail message to said transmitter;
   said transmitter including:
   a distributable program storing unit operable to store a plurality of distributable programs,
   said distribution controller being operable to receive the distribution request e-mail message addressed to said distribution controller, to determine whether the requested program is one of the stored plurality of distributable programs, to transmit an answer e-mail message to said receiver in response to the distribution request e-mail message, the answer e-mail message including a notice of correspondence and including supplemental information when the requested program is one of the stored plurality of distributable programs, the supplemental information including cryptanalytic information for decrypting the program, and to read out the requested program from said distributable program storing unit when the requested program is one of the stored plurality of distributable programs, and
   a distributor operable to distribute the requested program to said receiver.

2. The program distribution system according to claim 1, wherein said distributable program storing unit is further operable to store an associated title for each of the plurality of distributable programs, and
   said distribution controller is further operable to compare each word of the user request with each of the stored titles and to read out the requested program from said distributable program storing unit when the user request includes a title associated with one of the stored plurality of distributable programs.

3. The program distribution system according to claim 1, wherein said receiver is further operable to include a predetermined term in a subject field in the distribution request e-mail message, the predetermined term indicating that the distribution request e-mail message includes the user request.

4. The program distribution system according to claim 2, wherein the answer e-mail message includes the notice of correspondence when the user request includes a title associated with one of the stored plurality of distributable programs.

5. The program distribution system according to claim 1, wherein said receiver is further operable to transmit a confirmation e-mail message to said distribution controller in response to the answer e-mail message when the answer e-mail message includes the notice of correspondence, the confirmation e-mail message indicating that the user of said receiver has agreed to purchase the requested program, said distribution controller reading out the requested program from said distributable program storing unit when said distribution controller receives the confirmation e-mail message.

6. The program distribution system according to claim 4, wherein said receiver is further operable to transmit a confirmation e-mail message to said distribution controller in response to the answer e-mail message when the answer e-mail message includes the notice of correspondence, the confirmation e-mail message indicating that the user of said receiver has agreed to purchase the requested program, said distribution controller reading out the requested program from said distributable program storing unit when said distribution controller receives the confirmation e-mail message.

7. The program distribution system according to claim 1, further comprising a recorder connected to said receiver, and wherein the supplemental information includes a control command for causing said recorder to record the requested program.

8. The program distribution system according to claim 4, further comprising a recorder connected to said receiver, and wherein the supplemental information includes a control command for causing said recorder to record the requested program.

9. A method of distributing programs, said method comprising:
   receiving, at a transmitter, a distribution request e-mail message from a receiver, the distribution request e-mail message being addressed to a distribution controller of the transmitter and including a user request for a desired program, the user request being in a free style text format;
   determining whether the requested program is one of a stored plurality of distributable programs;
   transmitting an answer e-mail message to the receiver in response to the distribution request e-mail message, the answer e-mail message including a notice of correspondence and including supplemental information when the requested program is one of the stored plurality of distributable programs, the supplemental information including cryptanalytic information for decrypting the program;
   reading out the requested program when the requested program is one of the stored plurality of distributable programs; and
   distributing the requested program to the receiver.

10. The method according to claim 9, wherein an associated title is stored for each of the plurality of distributable programs, and said determining step includes comparing each word of the user request with each of the stored titles, and said reading out step reads out the requested program when the user request includes a title associated with one of the stored plurality of distributable programs.

11. The method according to claim 9, wherein the distribution request e-mail message includes a predetermined term in a subject field, the predetermined term indicating that the distribution request e-mail message includes the user request.

12. The method according to claim 10, wherein the answer e-mail message includes the notice of correspondence when the user request includes a title associated with one of the stored plurality of distributable programs.

13. The method according to claim 9, further comprising receiving a confirmation e-mail message from the receiver in response to the answer e-mail message when the answer e-mail message includes the notice of correspondence, the confirmation e-mail message indicating that the user of the receiver has agreed to purchase the requested program, and wherein said reading step and said distributing step are carried out only when the confirmation e-mail message is received.

14. The method according to claim 12, further comprising receiving a confirmation e-mail message from the receiver in response to the answer e-mail message when the answer e-mail message includes the notice of correspondence, the confirmation e-mail message indicating that the user of the receiver has agreed to purchase the requested program, and wherein said reading and said distributing step are carried out only when the confirmation e-mail message is received.

15. The method according to claim 9, wherein the supplemental information includes a control command for causing a recorder connected to the receiver to record the requested program.

16. The method according to claim 12, wherein the supplemental information includes a control command to cause a recorder connected to the receiver to record the requested program.

17. A transmitter, comprising:
a distributable program storing unit operable to store a plurality of distributable programs;
a distribution controller operable to receive a distribution request e-mail message addressed to said distribution controller from a receiver, the distribution request e-mail message including a user request for a desired program, the user request being in a free style text format, to determine whether the requested program is one of the stored plurality of distributable programs, to transmit an answer e-mail message to the receiver in response to the distribution request e-mail message, the answer e-mail message including a notice of correspondence and including supplemental information when the requested program is one of the stored plurality of distributable programs, the supplemental information including cryptanalytic information for decrypting the program, and to read out the requested program from said distributable program storing unit when the requested program is one of the stored plurality of distributable programs; and
a distributor operable to distribute the requested program to the receiver.

18. The transmitter according to claim 17, wherein said distributable program storing unit is further operable to store an associated title for each of the plurality of distributable programs, and said distribution controller is further operable to compare each word of the user request with each of the stored titles and to read out the requested program from said distributable program storing unit when the user request includes a title associated with one of the stored plurality of distributable programs.

19. The transmitter according to claim 17, wherein the distribution request e-mail message includes a predetermined term in a subject field, the predetermined term indicating that the distribution request e-mail message includes the user request.

20. The transmitter according to claim 18, wherein the answer e-mail message includes the notice of correspondence when the user request includes a title associated with one of the stored plurality of distributable programs.

21. The transmitter according to claim 17, wherein said distribution controller reads out the requested program from said distributable program storing unit when said distribution controller receives a confirmation e-mail message that is sent by the receiver in response to the answer e-mail message when the answer e-mail message includes the notice of correspondence, the confirmation e-mail message indicating that the user of the receiver has agreed to purchase the selected program.

22. The transmitter according to claim 20, wherein said distribution controller reads out the requested program from said distributable program storing unit when said distributable controller receives a confirmation e-mail message that is sent by the receiver in response to the answer e-mail message when the answer e-mail message includes the notice of correspondence, the confirmation e-mail message indicating that the user of the receiver has agreed to purchase the requested program.

23. The transmitter according to claim 17, wherein the supplemental information includes a control command for causing a recorder connected to the receiver to record the requested program.

24. The transmitter according to claim 20, wherein the supplemental information includes a control command for causing a recorder connected to the receiver to record the requested program.

25. A receiver, comprising:
a controller operable to accept a user request for a desired program, the user request being in a free style text format, to convert the user request into a distribution request e-mail message that includes the user request and that is addressed to a distribution controller of a predetermined distribution unit, and to send the distribution request e-mail message to the predetermined distribution unit; and
a front end operable to receive an answer e-mail message sent by the predetermined distribution unit in response to the distribution request e-mail message, the answer e-mail message including a notice of correspondence and including supplemental information when the requested program is one of the stored plurality of distributable programs, the supplemental information including cryptanalytic information for decrypting the program, and to receive the requested program from the predetermined distribution unit when the requested program is available from the predetermined distribution unit.

26. The receiver according to claim 25, wherein said controller is further operable to include a predetermined term in a subject field in the distribution request e-mail message, the predetermined term indicating that the distribution request e-mail message includes the user request.

27. The receiver according to claim 25, wherein said controller is further operable to transmit a confirmation e-mail message to the predetermined distribution unit when the answer e-mail message includes the notice of correspondence, the confirmation e-mail message indicating that the user of said receiver has agreed to purchase the requested program.

28. The receiver according to claim 25, wherein the supplemental information includes a control command for causing a recorder connected to said receiver to record the requested program.

29. A method of receiving programs, said method comprising:
accepting a user request for a desired program, the user request being in a free style text format;
converting the user request into a distribution request e-mail message that includes the user request and that is addressed to a distribution controller of a predefined distribution unit;
sending the distribution request e-mail message to the predetermined distribution unit;
receiving an answer e-mail message from the predetermined distribution unit in response to the distribution request e-mail message, the answer e-mail message including a notice of correspondence and including supplemental information when the requested program is one of the stored plurality of distributable programs, the supplemental information including cryptanalytic information for decrypting the program; and receiving the requested program from the predetermined distribution unit when the requested program is available from the predetermined distribution unit.

30. The method according to claim 29, wherein the distribution request e-mail message includes a predetermined term in a subject field, the predetermined term indicating that the distribution request e-mail message includes the user request.

31. The method according to claim 29, further comprising transmitting a confirmation e-mail message to the predetermined distribution unit when the answer e-mail message includes the notice of correspondence, the confirmation e-mail message indicating that the user has agreed to purchase the requested program.

32. The method according to claim 29, wherein the supplemental information includes a control command for causing a recorder record the received program.

33. The program distribution system according to claim 7, wherein the supplemental information includes accounting information for the program.

34. The program distribution system according to claim 8, wherein the supplemental information includes accounting information for the program.

35. The method according to claim 15, wherein the supplemental information includes accounting information for the program.

36. The method according to claim 16, wherein the supplemental information includes accounting information for the program.

37. The transmitter according to claim 23, wherein the supplemental information includes accounting information for the program.

38. The transmitter according to claim 24, wherein the supplemental information includes accounting information for the program.

39. The receiver according to claim 28, wherein the supplemental information includes accounting information for the program.

40. The method according to claim 32, wherein the supplemental information includes accounting information for the program.

* * * * *